US006880852B2

United States Patent
Lim

(10) Patent No.: US 6,880,852 B2
(45) Date of Patent: Apr. 19, 2005

(54) THREE WHEELED WHEELBARROW WITH HANDLE ADAPTOR

(75) Inventor: Fong Kan Lim, Rawang (MY)

(73) Assignee: Prestar Manufacturing SDN BHD, Rawang (MY)

( * ) Notice: Subject to any disclaimer, the term of this patent is extended or adjusted under 35 U.S.C. 154(b) by 20 days.

(21) Appl. No.: 10/304,431

(22) Filed: Nov. 26, 2002

(65) Prior Publication Data

US 2004/0041361 A1 Mar. 4, 2004

(30) Foreign Application Priority Data

Sep. 4, 2002 (MY) ........................................ PI20023300

(51) Int. Cl.⁷ ................................................. B62B 1/04
(52) U.S. Cl. .................. 280/653; 280/47.31; 280/47.2; 280/47.315; 16/426
(58) Field of Search .............................. 280/653, 47.31, 280/652, 654, 47.2, 47.3, 47.315, 47.32, 47.33, 47.26, 47.27; D34/12–27; 16/426

(56) References Cited

U.S. PATENT DOCUMENTS

| | | | | | |
|---|---|---|---|---|---|
| 3,173,705 A | * | 3/1965 | De Graff | ................. | 280/47.31 |
| 5,031,926 A | | 7/1991 | Wannamaker | ............. | 280/47.2 |
| 5,794,307 A | * | 8/1998 | Overcash et al. | ............. | 16/427 |
| 5,799,960 A | * | 9/1998 | Davis, Sr. | ................ | 280/47.31 |
| 5,915,706 A | * | 6/1999 | Du Puy | .................... | 280/47.26 |
| 6,193,265 B1 | | 2/2001 | Yemini | ........................ | 280/653 |
| 6,213,483 B1 | * | 4/2001 | Gaffney | .................... | 280/47.35 |
| 6,220,622 B1 | * | 4/2001 | Garcia | ......................... | 280/653 |
| 6,241,276 B1 | * | 6/2001 | Wilburn | ..................... | 280/659 |
| 6,390,496 B1 | * | 5/2002 | Eicher | ........................ | 280/653 |
| 6,508,478 B1 | * | 1/2003 | Ortez | ....................... | 280/47.34 |
| 6,550,104 B1 | * | 4/2003 | Cacciacarne | ................. | 16/426 |
| 6,554,301 B1 | * | 4/2003 | Scott et al. | ............. | 280/47.31 |
| 2001/0047569 A1 | | 12/2001 | Cacciacarne | ................. | 16/426 |

FOREIGN PATENT DOCUMENTS

| | | | | |
|---|---|---|---|---|
| CA | 2 324 122 | | 12/2001 | ............ B62B/3/00 |
| GB | 2172250 | * | 3/1985 | ............ B62B/3/02 |

* cited by examiner

Primary Examiner—J. Allen Shriver
(74) Attorney, Agent, or Firm—Wiggin and Dana LLP; Gregory S. Rosenblatt

(57) ABSTRACT

An ability to move a wheelbarrow without lifting the rear part of the wheelbarrow is achieved by attaching a handle adapter that extends upward from the rearwardly extending handles of the wheelbarrow. Further, a converter kit converts a conventional single wheeled wheelbarrow into a three wheeled device. The handle adapter is a tubular construction and can be easily detached from the wheelbarrow. In one embodiment of the converter kit, a plate and a hollow tube are attached to generally U shaped resting arms for easy assembly and disassembly of auxiliary wheels. A second embodiment of the converter kit includes a clamp for easily adjusting the auxiliary wheels of the wheelbarrow.

8 Claims, 5 Drawing Sheets

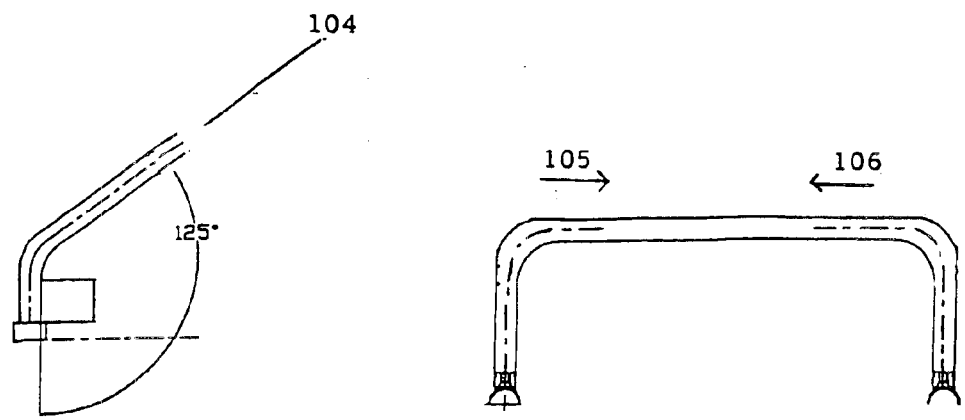
Figure 3a
Figure 3b
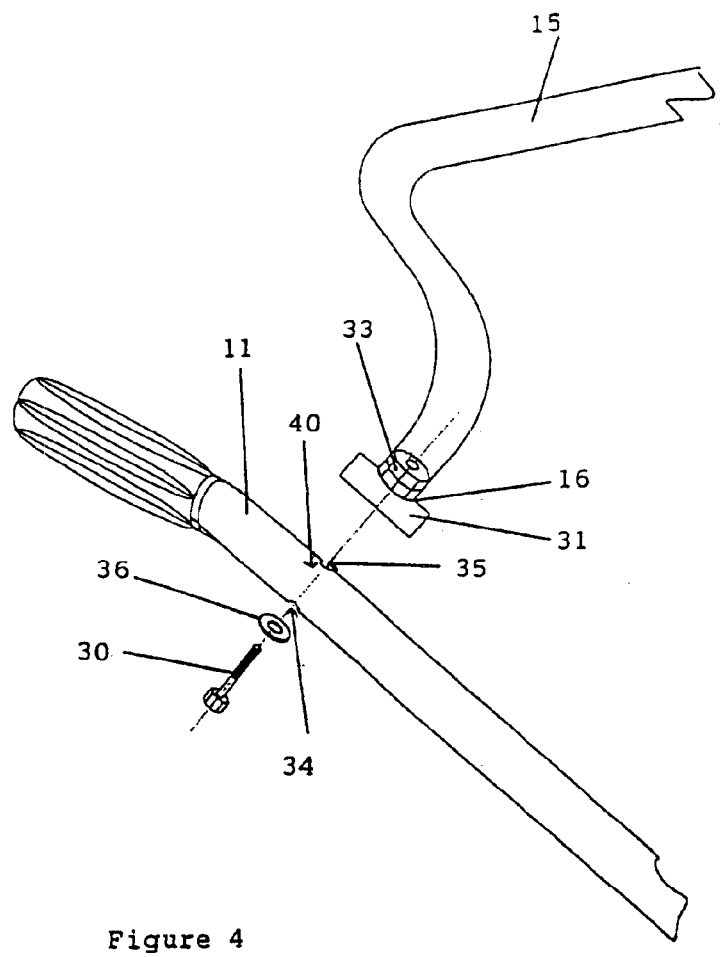
Figure 4

THREE WHEELED WHEELBARROW WITH HANDLE ADAPTOR

FIELD OF INVENTION

The present invention relates to wheelbarrow, and more particularly, to a raised handle adapter and a kit for converting a conventional wheelbarrow into a three-wheeled wheelbarrow.

BACKGROUND TO THE INVENTION

A conventional wheelbarrow consists of a container, a pair of handles extending rearwardly from the rear of the container, a front wheel and two rear generally U shaped resting arms. The conventional wheelbarrow design has a number of disadvantages. The wheelbarrow handle is normally mounted low which requires a user to bend down or lower the body to lift up a heavily loaded wheelbarrow. This might injure the user's back if care is not taken when lifting up the heavily loaded wheelbarrow. The wheelbarrow with single wheel mounted at the front, does not allow the user to push the heavy loads without lifting up the rear part of the wheelbarrow.

A prior art, U.S. Published patent application No. 2001/0047569 A1, design has increased the height of the handle. However, the single wheeled wheelbarrow still has to be lifted at the rear to move heavy loads for even a short distance.

A prior art, U.S. Pat. No. 6,193,265, design has a handle and two wheels mounted at the front of the wheelbarrow. The handle is convenient for tipping up the wheelbarrow. However, the height of the handle is low, which requires a user to bend down or lower the body to lift up the heavily loaded wheelbarrow. The two front wheels provide better stability than a single front wheeled wheelbarrow when moving the wheelbarrow. However, the two front-wheel wheelbarrow may be difficult to steer in a sharp corner and it is not possible to push the wheelbarrow through a path narrower than the width between the two wheels. The wheelbarrow needs to be lifted at the rear to move the heavily loaded wheelbarrow.

Other prior art, U.S. Pat. Nos. 6,241,276 and 5,031,926 and Canadian Patent No. CA 2324122, designs have a kit to convert the conventional single wheeled wheelbarrow into a three wheeled wheelbarrow. However, the kits are made up of a number of parts assembled together, which may be costly and time consuming to assemble or disassemble.

Therefore an object of the invention is to convert a single wheeled wheelbarrow into a three wheeled wheelbarrow so that a user can move a heavily loaded wheelbarrow without lifting the rear of the wheelbarrow. The conversion kit comprises a few parts assembled together, which is cheaper and easier to assemble and disassemble than prior art kits.

Another object of the invention is to provide an adapter handle higher than the existing handle. In doing so, a user can push or move the three wheeled wheelbarrow without lowering or bending down his or her body.

Yet another object of the present invention is to provide a wheelbarrow having the advantage of positioning the wheels lower or higher than the resting arms so as to allow the wheelbarrow to move on three wheels or to rest stationary on the ground with the two resting arms by just a simple lifting movement to change the position of the wheels of wheelbarrow.

SUMMARY OF THE INVENTION

The present invention has a handle adapter and a conversion kit to convert a single wheeled wheelbarrow into a three wheeled wheelbarrow, which allows a user to move a heavily loaded wheelbarrow without lowering the body or lifting the rear part of the wheelbarrow.

Preferably the invention is provided with parts which are easy to assemble and disassemble.

Preferably auxiliary wheels are secured to the wheelbarrow by using quick release pin.

Preferably the handle adapter is a single piece structure in tubular construction for ease of gripping.

Preferably the handle adapter is detachable from the three wheeled wheelbarrow.

Preferably the three wheeled wheelbarrow has a brake system for stationary resting of the wheelbarrow, even on an inclined area.

The objects and operation of wheelbarrow according to the present invention may be best understood with reference to the drawings and the accompanying detail description.

BRIEF DESCRIPTION OF THE DRAWINGS

FIGS. 3a and 3b show front, side and bottom views of the handle adapter.

FIG. 4 shows the handle adapter bolt attachment.

DETAILED DESCRIPTION OF THE INVENTION

Figure 1:
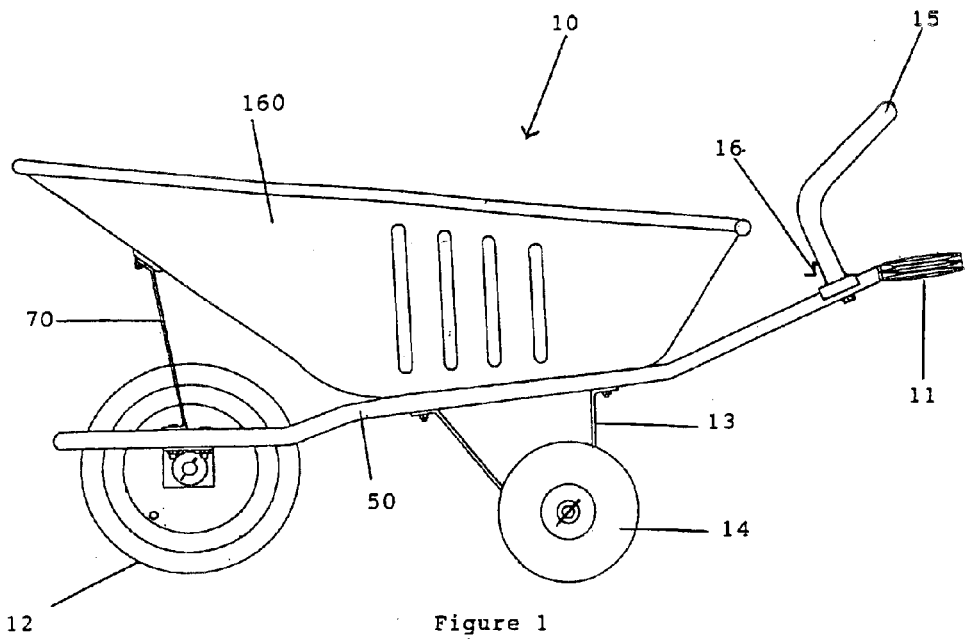
FIG. 1 shows a side view of the wheelbarrow.
Figure 2:
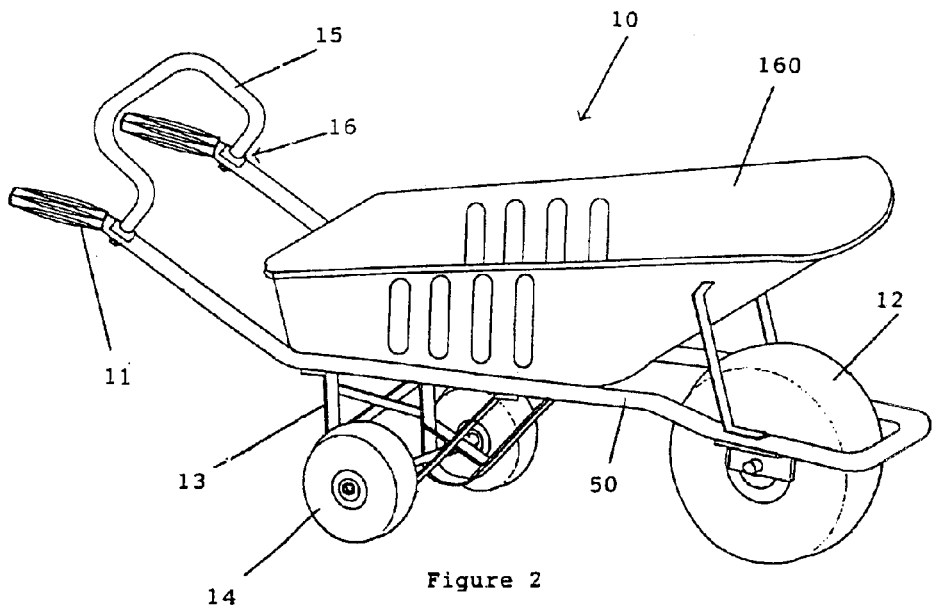
FIG. 2 shows a perspective view of the wheelbarrow.

With reference now to the drawing, FIGS. 1 through to 3 show a wheelbarrow, generally designated (10), comprising a container (160), a tubular structure (50) bent at an intermediate position forming a generally U shaped base frame of the wheelbarrow, and a pair of first handles (11) extending from free rear ends of the tubular structure (50) and intended to be lifted up to move the wheelbarrow (10) on front wheel (12). At least one, and preferably a pair of, generally U shaped resting arm (13) is mounted at the bottom rear of the container (160) whereby both free ends of the resting arm (13) are rigidly mounted to the tubular structure (50) to stabilize the wheelbarrow (10) when it is in resting position. A pair of auxiliary wheels (14) are attached to the resting arms (13) to form a three wheeled wheelbarrow. Proximal ends (16) of adapter handle (15) are mounted to the free ends of first handle (11), allowing a user to move the wheelbarrow 10 without lifting or lowering his or her body. The wheelbarrow (10) further includes a pair of support straps (70) which are attached to the front of the container (160) and front of the tubular structure (50).

The wheelbarrow handle adapter has an adapter handle (15) which is generally tubular. The proximal ends (16) of the adapter handle (15) are perpendicularly mounted to the existing handle (11). At the proximal ends (16), the adapter handle (15) is bent in direction (104), approximately 125 degrees towards the free ends of the existing handle (11). The adapter handle (15) is bent again in the direction (105, 106) approximately 90 degree, which is perpendicular to the first two bends, forming adapter handle (15) of a length about the same as the separation between the existing handles (11), allowing the hand to rest or grip onto the adapter handle (15).

FIG. 4 shows a partial view of the adapter handle (15) and the existing handle (11). A bracket (31) may be welded to the proximal ends (16) of the adapter handle (15) or fastened by other known methods in the art. The proximal end (16) of adapter handle (15) are bolted or attached by use of bolts or like means for attachment to the existing handle (11). The bracket (31) is an arch, which has a curve approximately the same as or slightly bigger than the arch of the existing handle (11), and firmly grips the top surface (40) of the existing handle (11) at the location of aperture (35). In addition, a nut (33) is rigidly attached inside each proximal end (16) of the adapter handle (15). A pair of washers (36) circumscribe the bolts (30) and are positioned between the heads of the bolts (30) and the apertures (34) of existing handle (11) to prevent the bolts (30) from burying partially into apertures (34) causing damage to the existing handle (11). The bolts (30) are inserted through the apertures (34, 35) of the existing handle (11) and threadedly coupled to the nuts (33).

Figure 5:
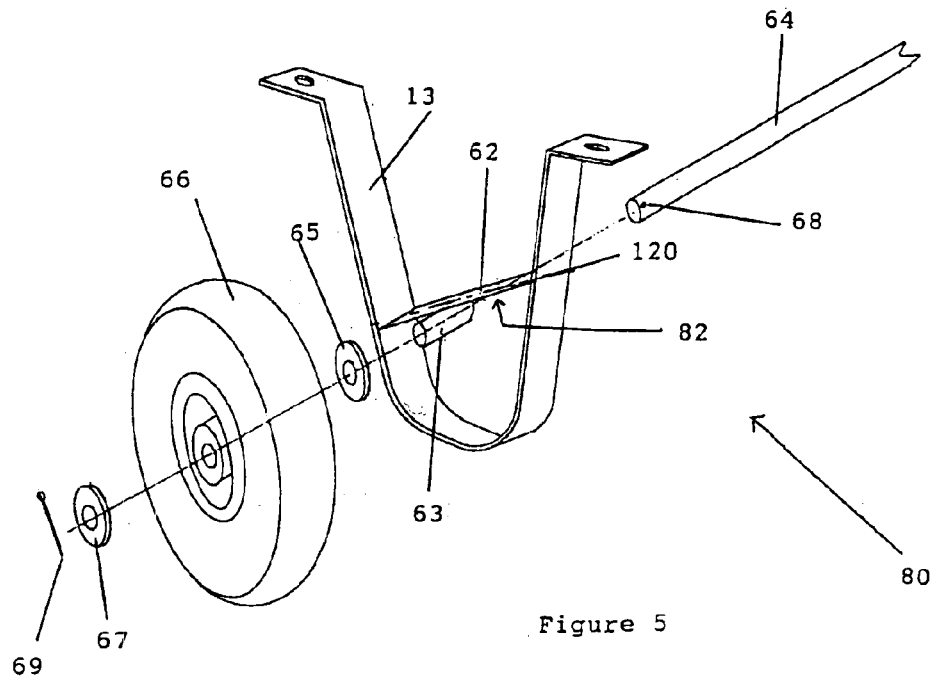
FIG. 5 shows partial front and side views of an alternate embodiment of the wheelbarrow kit.
Figure 6:
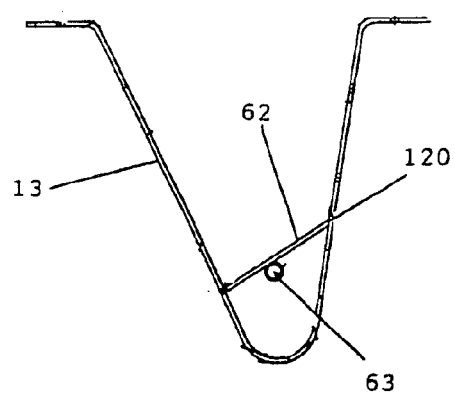
FIG. 6 shows top and side view of the kit and U shaped resting arm.

With reference now to FIGS. 5 and 6, the first embodiment (80) of wheelbarrow conversion kit, it is seen that a generally U shaped resting arm (13) extends downwardly from the wheelbarrow (10). A plate (62) is welded or attached by other known methods in the art to the U shaped resting arm (13). The plate (62) is attached in the direction (120) with a slope of about 32 degree down towards the front of the wheelbarrow. A hollow tube (63) is welded or attached by other known methods in the art to the bottom surface (82) of the plate (62) and positioned at the intermediate of the plate (62). An axle (64), extends through the hollow tube (63). On opposing ends of the axle are attached, a first washer (65), a rotatable auxiliary wheel (66) and a second washer (67) in that order. Preferably, the axle (64) has an aperture (68) extended through the axle (64) at the opposite free ends. Preferably, a pair of first washers (65) extend around the axle (64) and are positioned between the auxiliary wheel (66) and the hollow tube (63). A pair of auxiliary wheels (66) are rotatably coupled to the axle (64) and positioned towards opposite free ends of the axle (64). The auxiliary wheels (66) have a predetermined radius which is greater than the distance between the center of the hollow tube (63) and the lowest most terminal end of the U shaped resting arm (13). Preferably, a pair of second washers (67) extend around the axle (64) and are positioned between the auxiliary wheel (66) and a quick-release pin (69). A pair of clips or quick-release pins (69) are inserted into the aperture (68) at the opposite free ends of the axle (64). The clips or quick-release pins (69) help to prevent the auxiliary wheels (66) from slipping outward and can be easily removed to assemble and disassemble the axle (64).

Figure 7:
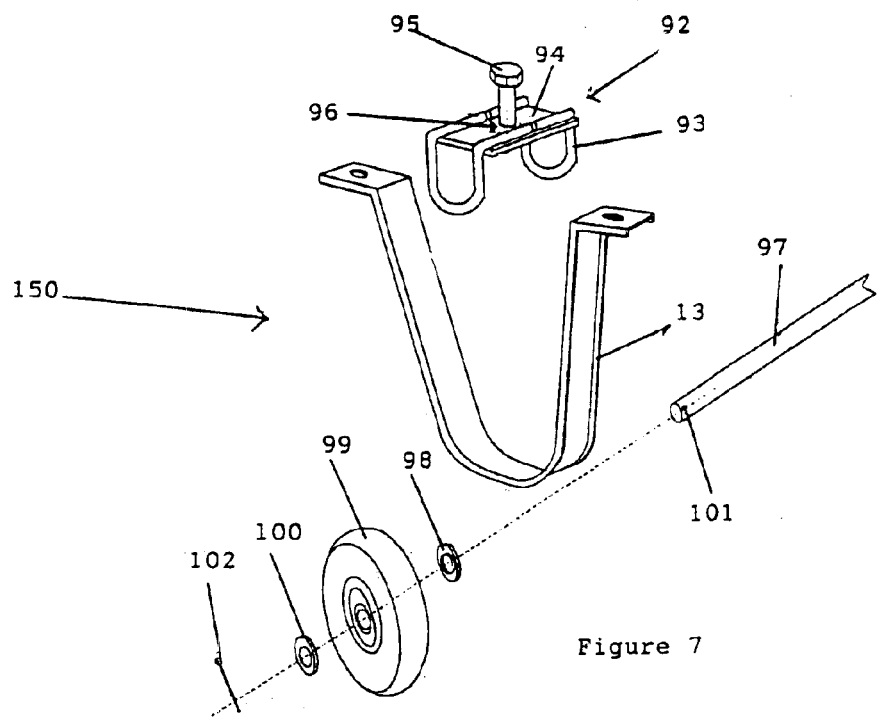
FIG. 7 shows partial front and side views of an alternate embodiment of the wheelbarrow.
Figure 8:
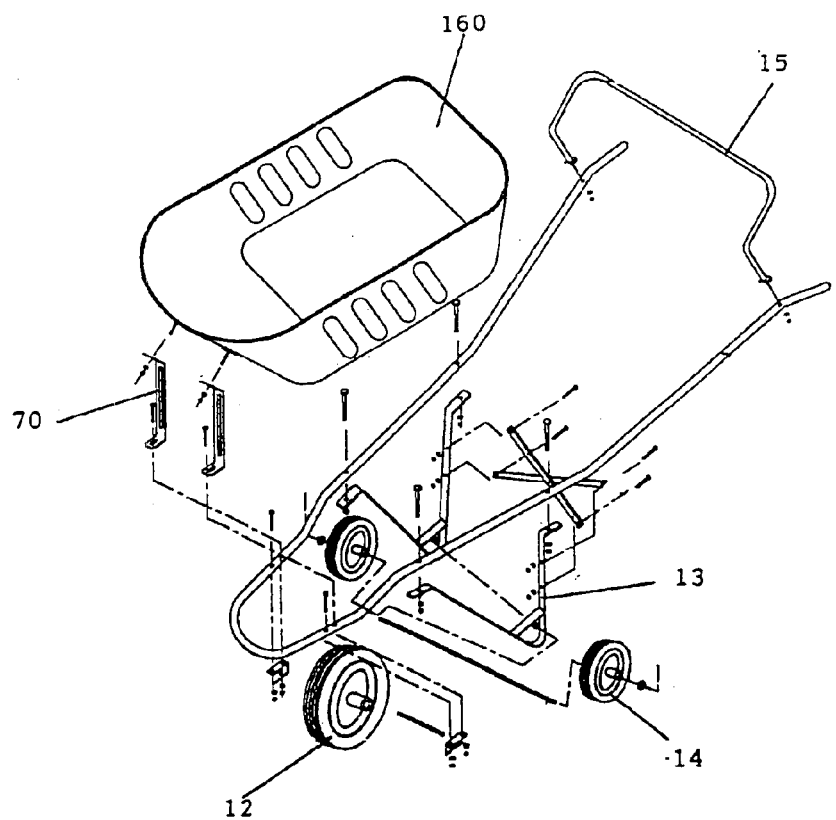
FIG. 8 shows a perspective view of the wheelbarrow.

In a second embodiment (150) as shown in FIG. 7, it is seen that a generally U shaped resting arm (13) extends downwardly from the wheelbarrow (10). A pair of clamps (92) are each comprised of a plurality of U shaped rods (93), a metal plate (94) and a bolt (95). The plurality of U shaped rods (93) are bent approximately 90 degrees at an intermediate position and welded or attached to the top surface of the metal plate (94) and positioned at opposite ends of the metal plate (94). A threaded aperture (96) is positioned at the center of the metal plate (94). Preferably, an axle is extended through the clamp (92), a first washer (98), a rotatable auxiliary wheel (99) and a second washer (100) in that order. The bolt (95) threadedly coupled to the threaded aperture (96) of the metal plate (94) until the axle (97) is attached rigidly between the U shaped resting arms (13) and the U shaped rod (93). Preferably, the axle (97) has an aperture (101) extending into the axle at the opposite free ends. Preferably, first washers (98) extend around the axle (97) and are positioned between the auxiliary wheels (99) and the clamp (92). Auxiliary wheels (99) are rotatably coupled to the axle (97) and are positioned towards opposite free ends of the axle (97). Auxiliary wheels (99) have a predetermined radius which is greater than the distance between the center of the clamp (92) and the lowest most terminal end of the U shaped resting arm (13). Preferably, second washers (100) extend around the axle (97) and are positioned between the auxiliary wheels (99) and the clips or quick-release pins (102). Clips or quick-release pins (102) are inserted through the aperture (101) at opposite free ends of the axle (97). The clips or quick-release pins (69) helps to prevent the auxiliary wheels (65) from slipping outward and can be easily removed to assemble and disassemble the axle (97).

Figure 9:
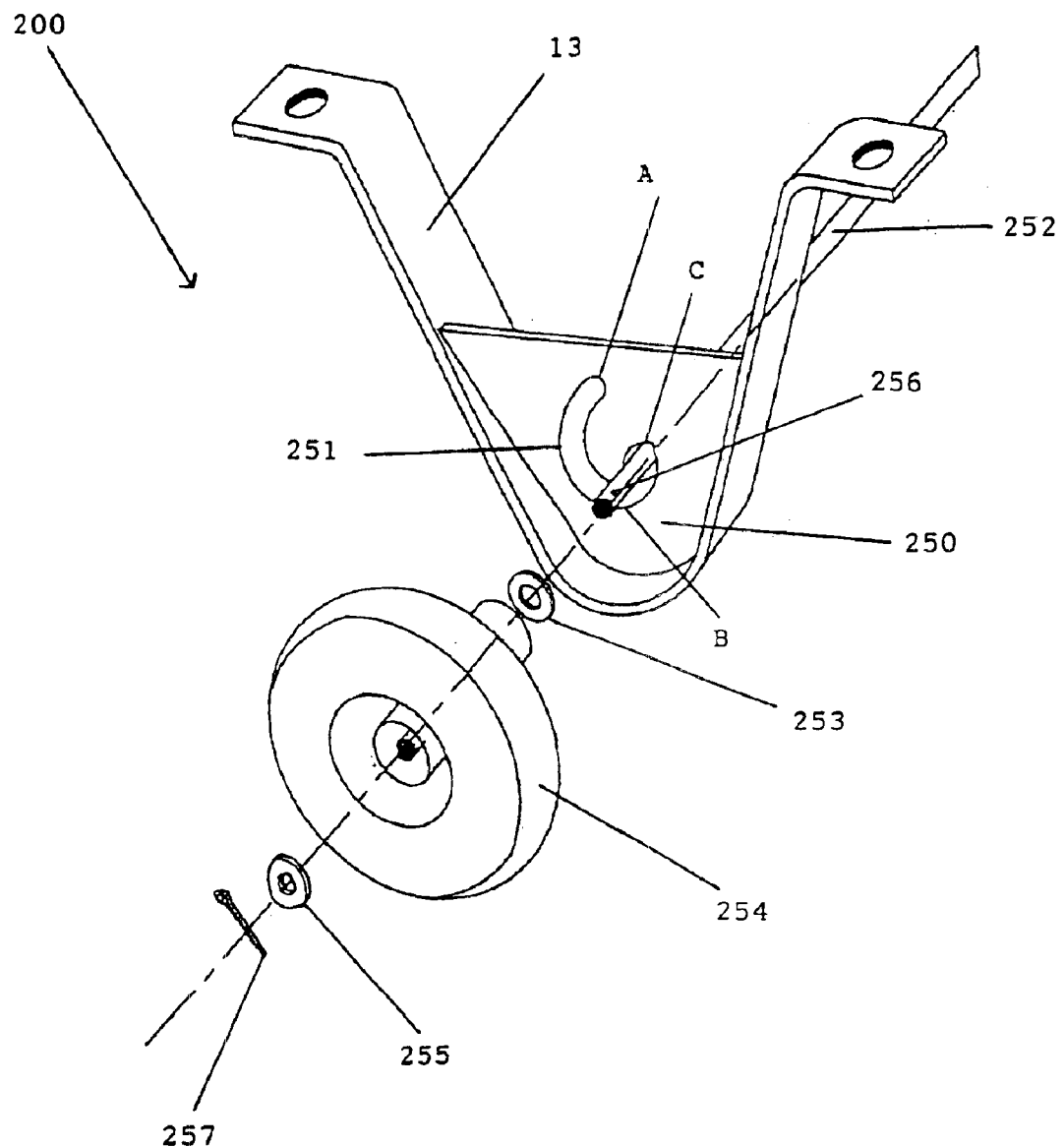
FIG. 9 shows a side view of an alternate embodiment of the wheelbarrow kit.

In a third embodiment (200) as shown in FIG. 9, it is seen that a generally U shaped resting arm (13) extends downwardly from the wheelbarrow (10). A plate (250) is rigidly attached to the U shaped resting arms (13), with the plate (250) having a G-shaped slot (251) positioned in the center of the plate (250). Preferably, an axle (252) extends through the G-shaped slot (251) of the plate (250). A first washer (253), an auxiliary wheel (254) and a second washer (255) extend in that order through each end of the axle. Preferably, the axle (252) has an aperture (256) extending into the axle (252) at the opposite free ends. Preferably, the pair of first washers (253) extend around the axle (252) and are positioned between the wheels (254) and the plate (250). The pair of auxiliary wheels (254) are coupled to the axle (252) and are positioned towards opposite free ends of the axle (252). The auxiliary wheels (254) have a predetermined radius which is greater than the distance between the lowest most terminal end position B of the G shaped slot (251) and the lowest most terminal end of the U shaped resting arm (13). Preferably, the pair of second washers (255) extend around the axle (252) and are positioned between the auxiliary wheels (254) and a pair of clips or quick-release pins (257). The clips or quick-release pins (257) are inserted into the aperture (256) at the opposite free ends of the axle (252). The clips or quick-release pins (257) helps to prevent the auxiliary wheels (254) from slipping outward and can easily be removed to assemble and disassemble the axle (252).

When the wheelbarrow (200) is used as a three wheeled wheelbarrow, the axle is in the position C of the G-shaped slot (251). When user wants to station the wheelbarrow (200) on the ground, the user needs to lift up the rear end of the wheelbarrow (200) and the axle (252) will move from position C to position A of the G-shaped slot and the axle (252) will move to the upper most terminal end position A of the G slot (251) by backward pull of the wheelbarrow (200). To move the axle back to position C in order to use wheelbarrow on three wheels, the rear end of the wheelbarrow is lifted up, the axle is move to the lowest most terminal end position B of the G-shaped slot (251) and a forward push will move the axle from position B to position C of the G-shaped slot.

The scope of the invention should be defined only in accordance with the claims that follow. In the following claims, reference characters used to designate claim steps are provided for convenience of description only, and are not intended to imply any particular order for performing the steps.

What is claimed is:

1. A three wheeled wheelbarrow with handle adapter comprising:

a container;

a tubular structure forming a base frame of the wheelbarrow, whereby said frame is attached rigidly to said container;

a pair of first handles extending from both free rear ends of said base frame;

a wheel attached to a front end of said tubular structure;

a pair of generally U shaped resting arms extended downwardly from a bottom rear portion of said container, whereby free ends of said generally U shaped resting arms are rigidly mounted to said tubular structure;

a pair of plates attached vertically to the said pair of generally U shaped resting arms, whereby each said plate has a slot extending therethrough;

an elongated axle mounted through said slots in the plates;

a pair of removable wheels mounted to said elongated axle; and a second handle of higher height than said pair of first handles mounted to said pair of first handles for easy tilting, pushing or pulling said wheelbarrow without bending or lowering the body and to move said wheelbarrow without lifting the rear end of said wheelbarrow;

wherein said second handle first bends vertically at proximal ends near to said pair of first handles and second bends horizontally relative to said first handles in an arch to form an adapter handle of about the same width as the separation of the pair of first handles.

2. The three wheeled wheelbarrow with handle adapter as claimed in claim 1, wherein said wheelbarrow further has a pair of strips which are attached to both a front of said container and said front end of said tubular structure for stability.

3. The three wheeled wheelbarrow with handle adapter as claimed in claim 1, wherein said proximal ends are detachably attached to said first handle.

4. The wheelbarrow as claimed in claim 1, wherein said elongated axle has an aperture extending into it at opposite free ends to allow quick release pins to attach thereto.

5. The wheelbarrow as claimed in claim 4, wherein said quick release pins prevent said removable wheels from slipping outward.

6. The wheelbarrow as claimed in claim 1, wherein said slot is a G-shaped slot which enables the user to use the wheelbarrow as a three wheeled wheelbarrow or to station said wheelbarrow on its generally U shaped resting arms.

7. A three wheeled wheelbarrow with handle adapter, comprising:

a container;

a tubular structure forming a base frame of the wheelbarrow, whereby said frame is attached rigidly to said container;

a pair of first handles extending from both free rear ends of said base frame;

a wheel attached to a front end of said tubular structure;

a pair of removable wheels mounted to said tubular structure; and a second handle of higher height than said pair of first handles mounted to said pair of first handles for easy tilting, pushing or pulling said wheelbarrow without bending or lowering the body and to move said wheelbarrow without lifting the rear end of said wheelbarrow;

wherein said second handle has two proximal ends and four bends, said proximal ends are detachably attached to said first handle;

wherein said four bends of said second handle include first two bends bent approximately 125 degree vertically near to the proximal ends and second two bends bent approximately at a right angle horizontally between the first two bends, forming an adapter handle of about the same width as the separation of the pair of first handles.

8. A three wheeled wheelbarrow with handle adapter, comprising:

a container;

a tubular structure forming a base frame of the wheelbarrow, whereby said frame is attached rigidly to said container;

a pair of first handles extending from both free rear ends of said base frame;

a wheel attached to a front end of said tubular structure;

a pair of removable wheels mounted to said tubular structure; and a second handle of higher height than said pair of first handles mounted to said pair of first handles for easy tilting, pushing or pulling said wheelbarrow without bending or lowering the body and to move said wheelbarrow without lifting the rear end of said wheelbarrow;

wherein said second handle has two proximal ends and four bends, said proximal ends are detachably attached to said first handle;

wherein said proximal ends are detachedly attached to said pair of first handles by an arch and a pair of nuts attached inside the tubular construction, and positioned at the proximal ends, said pair of nuts attached to the pair of first handles by a pair of bolts threadedly coupled to the pair of nuts through apertures in the pair of first handles.

* * * * *